(12) United States Patent
Olliphant et al.

(10) Patent No.: US 9,524,496 B2
(45) Date of Patent: Dec. 20, 2016

(54) MICRO PAYMENTS

(76) Inventors: Hugo Olliphant, San Francisco, CA (US); Ernest Mak, Cupertino, CA (US); Muralidhar Ravuri, Sunnyvale, CA (US); Mark J. Boyd, Mountain View, CA (US); Musaab At-Taras, San Jose, CA (US)

( * ) Notice: Subject to any disclaimer, the term of this patent is extended or adjusted under 35 U.S.C. 154(b) by 0 days.

(21) Appl. No.: 11/962,511

(22) Filed: Dec. 21, 2007

(65) Prior Publication Data
US 2008/0235123 A1 Sep. 25, 2008

Related U.S. Application Data

(60) Provisional application No. 60/919,097, filed on Mar. 19, 2007.

(51) Int. Cl.

| | | |
|---|---|---|
| *G06Q 30/06* | (2012.01) | |
| *G06Q 10/10* | (2012.01) | |
| *G06Q 20/12* | (2012.01) | |
| *G06Q 20/22* | (2012.01) | |
| *G06Q 40/00* | (2012.01) | |
| *G06Q 40/02* | (2012.01) | |

(52) U.S. Cl.
CPC ............ *G06Q 20/12* (2013.01); *G06Q 20/29* (2013.01); *G06Q 30/06* (2013.01); *G06Q 40/00* (2013.01); *G06Q 40/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,826,241 A | * | 10/1998 | Stein | ...................... G06Q 10/00 705/26.41 |
| 5,875,291 A | * | 2/1999 | Fox | ..................... G06F 11/1474 707/999.2 |
| 7,047,241 B1 | * | 5/2006 | Erickson | ................. G06F 21/10 |
| 7,069,497 B1 | * | 6/2006 | Desai | .................. G06F 17/3089 707/E17.116 |

(Continued)

FOREIGN PATENT DOCUMENTS

WO WO-2008115492 A1 9/2008

OTHER PUBLICATIONS http://web.archive.org/web/20060218075426/http://whatis.techtarget.com/definition/0,,sid9_gci21 . . . Whatis.com definition of widget from Feb. 18, 2006.*

(Continued)

*Primary Examiner* — William Rankins
(74) *Attorney, Agent, or Firm* — Maschoff Brennan

(57) ABSTRACT

In one example embodiment, a system and method is shown that includes receiving financial data generated by a widget residing on a web page, the financial data including at least one of donation, or purchase data. The system and method may further include transmitting a display update to update the widget, the updating based upon the financial data. Some example embodiments may include, selecting a widget using an input device to generate data including at least one of donation or purchase data. Moreover, the system and method may include transmitting the at least one of donation or purchase data. Further, the system and method may include storing the at least one of donation or purchase data to a cookie.

13 Claims, 12 Drawing Sheets

(56) References Cited

U.S. PATENT DOCUMENTS

| | | | |
|---|---|---|---|
| 7,089,208 B1* | 8/2006 | Levchin | G06Q 20/02 705/35 |
| 7,627,521 B1* | 12/2009 | Sheehan | G06Q 20/02 705/38 |
| 8,370,749 B2* | 2/2013 | Morse | G06Q 20/02 715/738 |
| 2001/0021917 A1* | 9/2001 | Hatano | G06Q 30/06 705/27.1 |
| 2002/0051541 A1* | 5/2002 | Glick | H04L 63/0421 380/258 |
| 2002/0083009 A1* | 6/2002 | Lansing | G06Q 20/04 705/64 |
| 2002/0120567 A1 | 8/2002 | Caplan et al. | |
| 2003/0093378 A1 | 5/2003 | Silverbrook et al. | |
| 2003/0110137 A1* | 6/2003 | Armingaud | G06F 21/6245 705/64 |
| 2004/0117308 A1* | 6/2004 | Bouknight, Jr. | G07C 9/00158 705/44 |
| 2004/0167853 A1 | 8/2004 | Sharma | |
| 2005/0021478 A1* | 1/2005 | Gautier | G06Q 20/12 705/65 |
| 2005/0044224 A1* | 2/2005 | Jun | G06Q 20/10 709/225 |
| 2005/0051541 A1* | 3/2005 | Kim | 219/686 |
| 2005/0065881 A1* | 3/2005 | Li | G06Q 30/0641 705/40 |
| 2005/0109831 A1* | 5/2005 | Obara | G06Q 20/18 235/379 |
| 2005/0119972 A1* | 6/2005 | Inglis | G06Q 20/02 705/40 |
| 2005/0204047 A1* | 9/2005 | Mitchell | H04L 67/02 709/228 |
| 2005/0285867 A1* | 12/2005 | Brunner | G09G 5/393 345/537 |
| 2006/0080238 A1 | 4/2006 | Nielsen et al. | |
| 2006/0085549 A1* | 4/2006 | Hasti | H04L 67/1034 709/227 |
| 2006/0100924 A1* | 5/2006 | Tevanian | G06Q 30/02 705/14.23 |
| 2006/0123052 A1* | 6/2006 | Robbin | G06Q 30/00 |
| 2006/0273152 A1* | 12/2006 | Fields | G06Q 20/40 235/380 |
| 2007/0138270 A1* | 6/2007 | Reblin | G06Q 10/08 235/383 |
| 2007/0150368 A1* | 6/2007 | Arora | G06Q 30/02 705/26.1 |
| 2007/0250920 A1* | 10/2007 | Lindsay | G06F 21/31 726/7 |
| 2007/0271149 A1* | 11/2007 | Siegel | G06Q 30/0603 705/26.41 |
| 2007/0288328 A1* | 12/2007 | Moon | G06F 17/3089 705/26.8 |
| 2007/0299742 A1* | 12/2007 | Williams | G06Q 20/02 705/39 |
| 2008/0027874 A1* | 1/2008 | Monseignat | G06Q 20/10 705/74 |
| 2008/0046314 A1* | 2/2008 | Chung | G06Q 30/02 705/14.51 |
| 2008/0086477 A1* | 4/2008 | Hawkins | G06F 17/30902 |
| 2008/0097871 A1* | 4/2008 | Williams | G06Q 20/10 705/500 |
| 2008/0113614 A1* | 5/2008 | Rosenblatt | G06Q 30/06 455/3.05 |
| 2008/0215879 A1* | 9/2008 | Williams | G06Q 10/107 713/159 |
| 2008/0227435 A1* | 9/2008 | Six | H04W 4/12 455/414.1 |
| 2008/0235042 A1 | 9/2008 | Boyd et al. | |
| 2008/0294751 A1* | 11/2008 | Dreiling | G06F 17/30893 709/219 |
| 2009/0049157 A1* | 2/2009 | Kimura | G06Q 20/1235 709/219 |
| 2009/0307494 A1* | 12/2009 | Bertin | G06Q 20/045 713/170 |
| 2009/0313166 A1* | 12/2009 | McNab | G06Q 20/10 705/42 |
| 2010/0174626 A1* | 7/2010 | Stringfellow | G06Q 20/02 705/30 |
| 2012/0317018 A1* | 12/2012 | Barnett | G06Q 20/02 705/39 |
| 2013/0007849 A1* | 1/2013 | Coulter | G06F 21/10 726/4 |
| 2013/0018785 A1* | 1/2013 | Dolphin | G06Q 20/10 705/40 |
| 2013/0232075 A1* | 9/2013 | Monaghan | G06Q 20/12 705/44 |

OTHER PUBLICATIONS

"About the Amazon Honor System", http://zme.amazon.com/exec/varzea/subst/fx/help/how-we-know.html/104-5178630-9145532, (Copyright 1995-2006).

International Application Seial No. PCT/US2008/03535, Search Report mailed Jun. 12, 2008, 4 pgs.

International Application Serial No. PCT/US2008/03535, Written Opinion mailed Jun. 12, 2008, 5 pgs.

"International Application Serial No. PCT/US2008/003535, International Preliminary Examination Report mailed Oct. 1, 2009", 6 pgs.

* cited by examiner

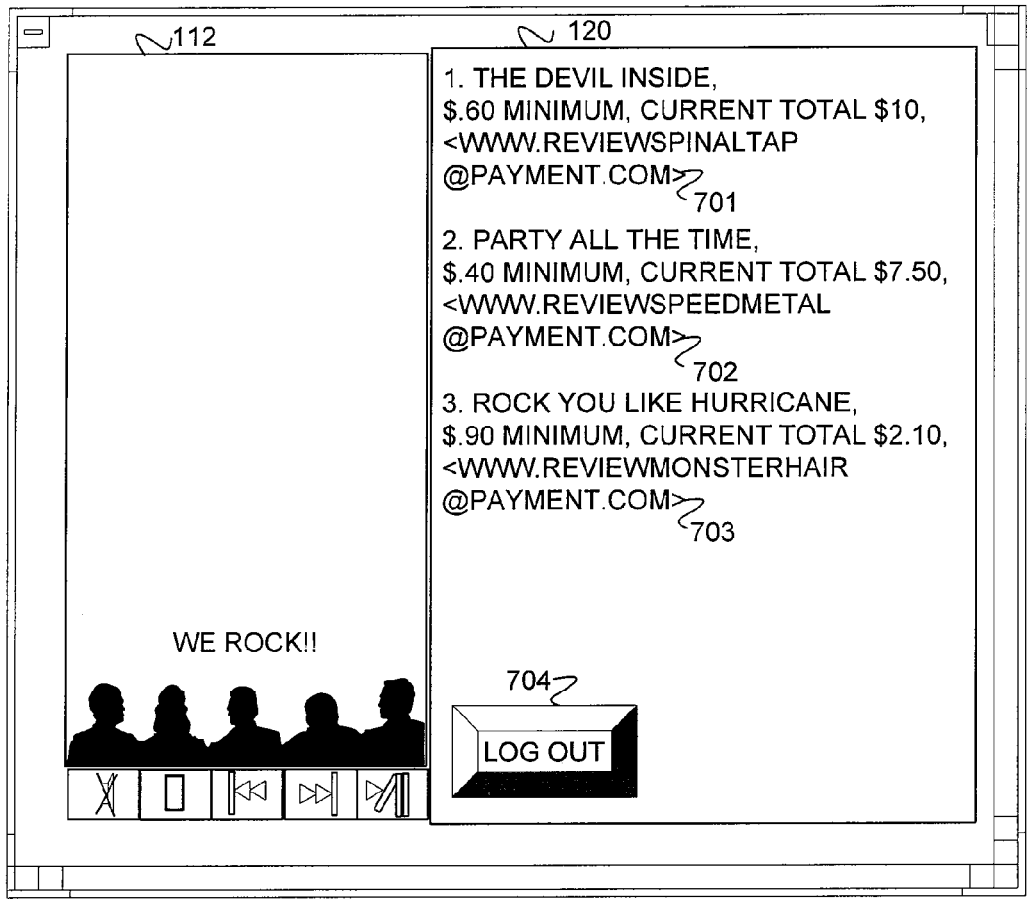

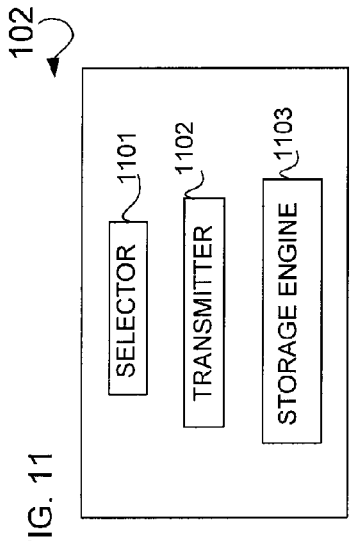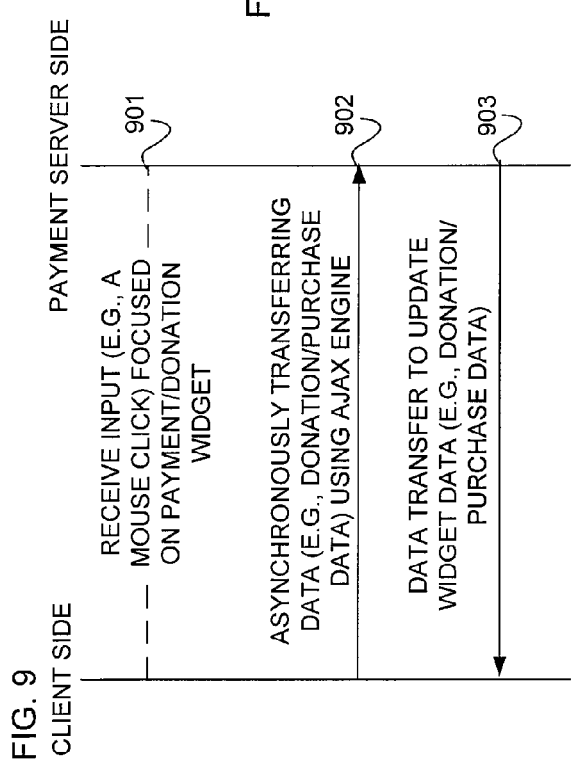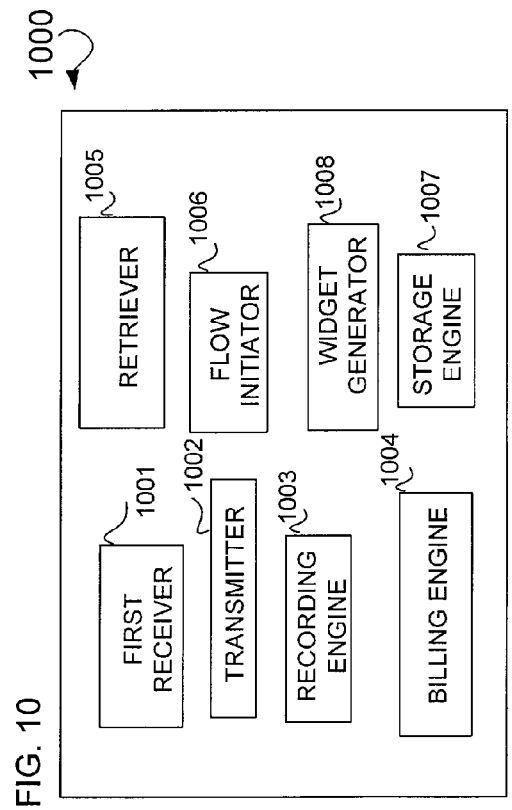

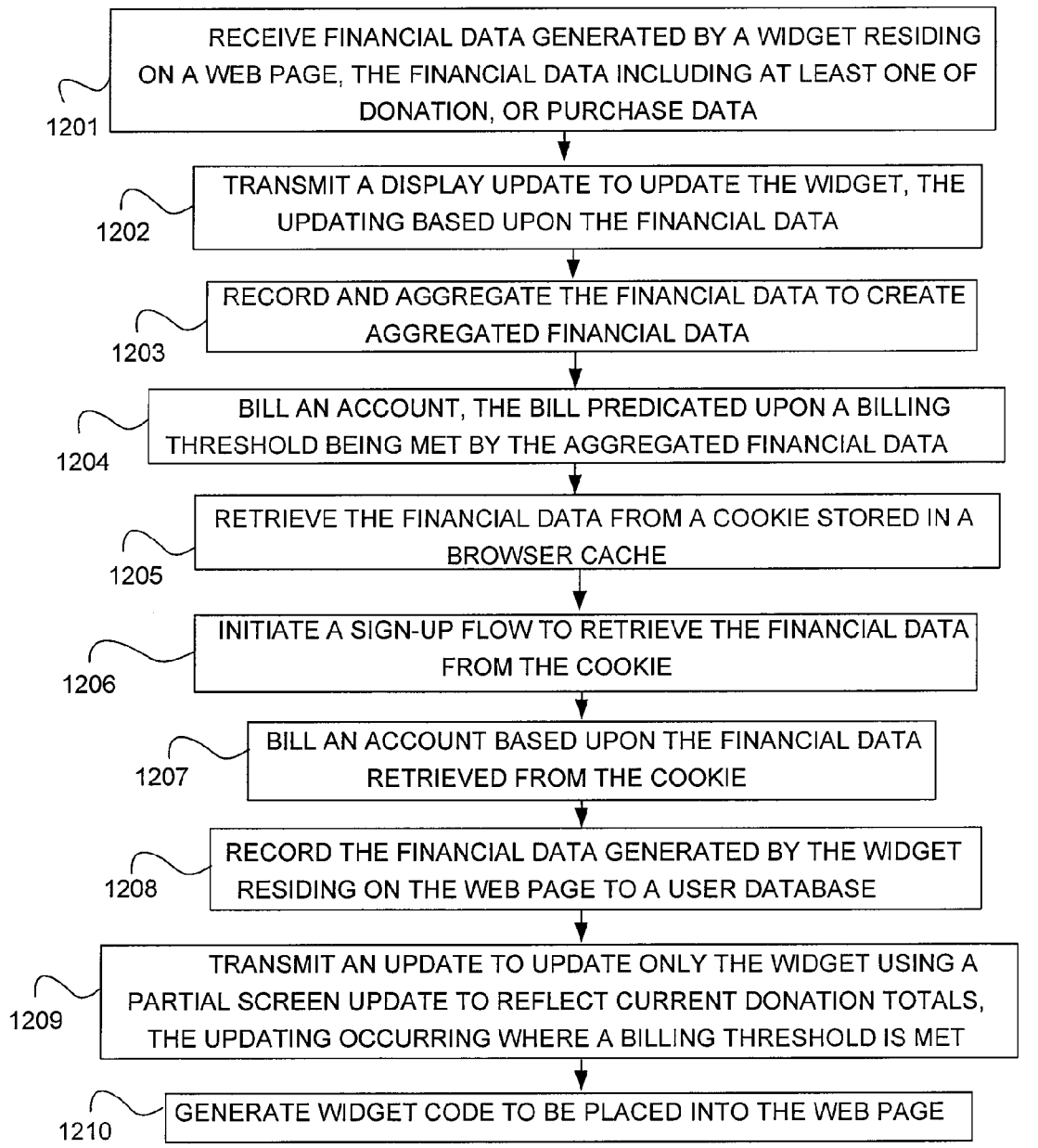

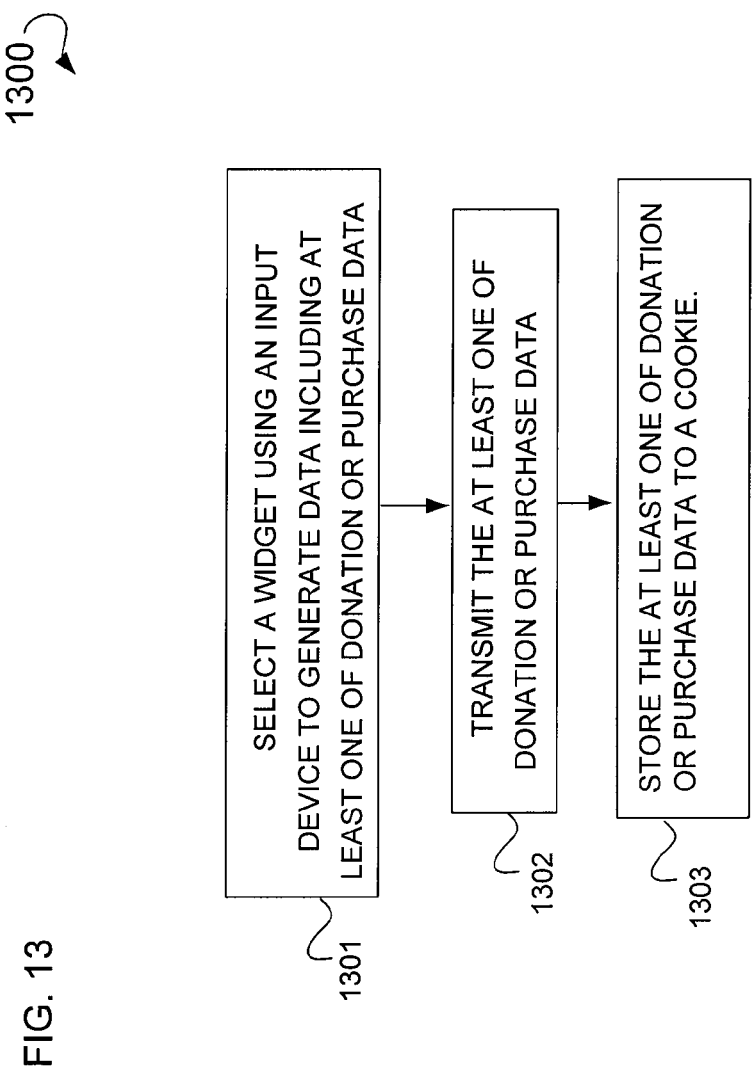

MICRO PAYMENTS

CROSS REFERENCE TO RELATED APPLICATIONS

This is a United States Patent Application that claims priority under 35 U.S.C. §119(e) to a United States Provisional Patent Application titled: "MICRO PAYMENTS," (Ser. No. 60/919,097) filed on Mar. 19, 2007, and which is incorporated by reference in its entirety herein.

TECHNICAL FIELD

The present application relates generally to the technical field of algorithms and programming and, in one specific example, to the use of a payment algorithm to make donations and purchases.

BACKGROUND

Common to many business functions implemented on web pages carried out over the internet is the request/response paradigm, whereby a user may make a request (e.g., request to purchase something), and then receive a response (e.g., a confirmation that the user has made a purchase). This request/response paradigm fails to capture the real-time experience of making a purchase or donation. Moreover, this request/response paradigm uses large amounts of bandwidth and computing resources since, in the case of web pages used to transact business, a new web page must be generated every time an additional step in the business transaction takes place.

BRIEF DESCRIPTION OF THE DRAWINGS

Some embodiments are illustrated by way of example and not limitation in the figures of the accompanying drawings in which:

FIG. 7 is a diagram of a published page illustrating rendered widget code, according to an example embodiment.

FIG. 8 is a diagram of formatted data, according to an example embodiment.

FIG. 9 is a sequence diagram illustrating a sequence for the asynchronous transmission of data, according to an example embodiment.

FIG. 10 is a block diagram of a server in the form or a payment server or a widget application server, according to an example embodiment.

FIG. 11 is a block diagram of a device, according to an example embodiment.

FIG. 12 is a flow chart of a method used to generate payment or donation data, according to an example embodiment.

FIG. 13 is a flow chart of a method used to select a widget to make a payment or donation, according to an example embodiment.

DETAILED DESCRIPTION

Figure 1:
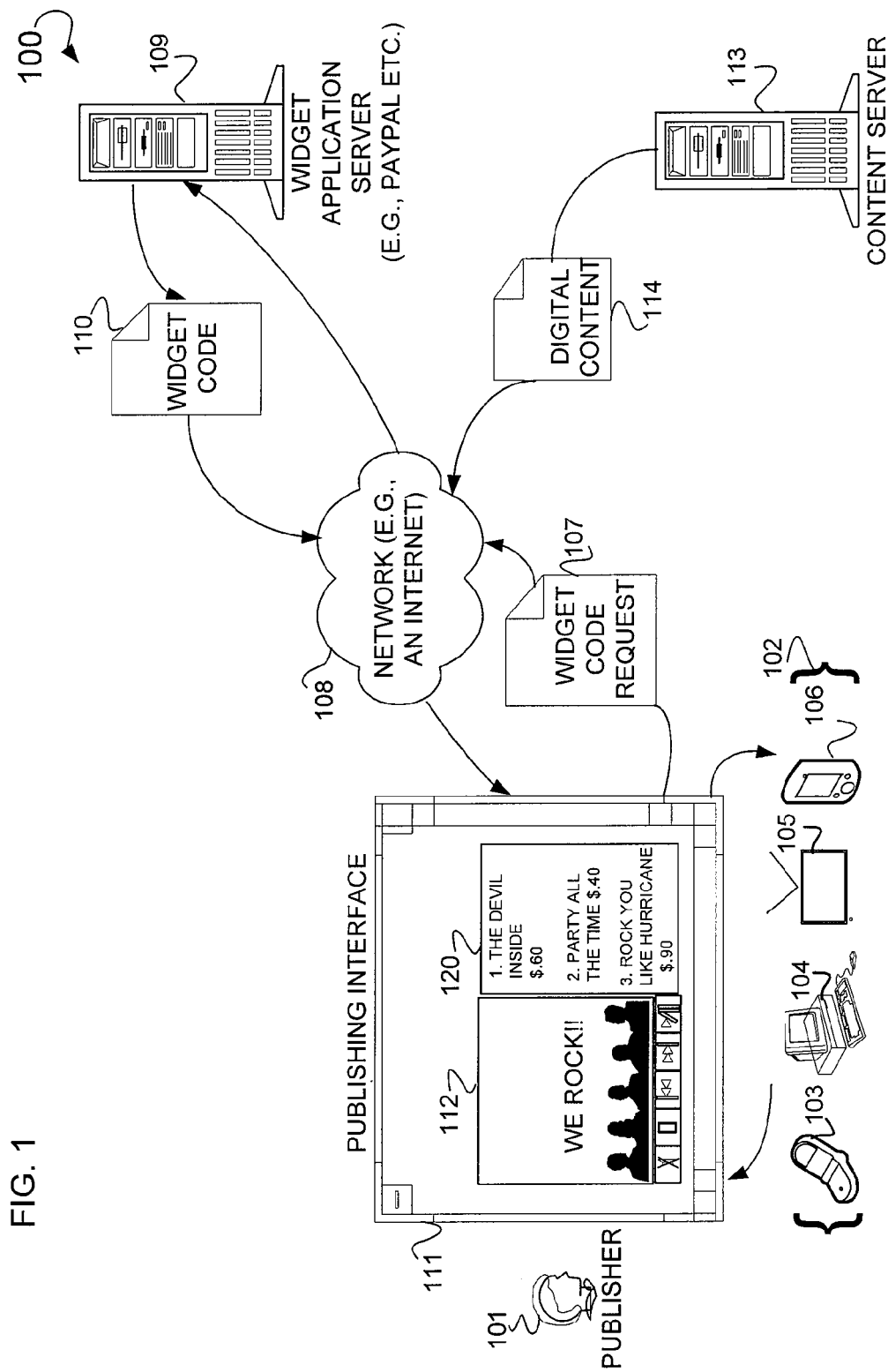
FIG. 1 is a diagram of a system illustrating a request and retrieval of widget code, according to an example embodiment.

Embodiments of methods and systems to use a payment algorithm to make donations and purchases are illustrated herein. In the following description, for purposes of explanation, numerous specific details are set forth to provide a thorough understanding of some embodiments. It may be evident to one skilled in the art, however, that some embodiments may be practiced without these specific details.

In some example embodiments, a system and method for transacting business over a network (e.g., an internet) in the form of micro payments is illustrated. In one embodiment, a user is able to make a payment in the form of a donation or a purchase without having to execute a large number of display pages (e.g., web pages, user interfaces, etc.) during the process of making the payment. Specifically, the user may be able to asynchronously (e.g., an asynchronous paradigm) make a payment, without having to load a web page related to making the payment. Rather than following the request/response paradigm of many existing internet payment methods, in one example embodiment, a user need only execute a screen object or widget (e.g., collectively payment widget) in order for the payment to be made. A widget may be a web widget in the form of a portable chunk of code that can be installed and executed within any separate Hyper Text Markup Language (HTML)-based web page by an end user. Additionally, a widget may be an interface element that a computer's user interacts with, such as a window or a text box as appearing within a GUI. In some example embodiments, this screen object or widget may make a payment and reflect that the payment has been made by way of the screen object or widget being automatically updated. A payment in the form of a donation may contain financial information relating to money to be donated to an organization such as a charitable organization, a band or other performing group, or individual. A payment in the form of financial information may relate to money to be paid in exchange for some thing that is purchased such as digital content (e.g., music, audio/visual content), or some other suitable good or service that can be purchased.

Example embodiments may include a record of a donation or payment being stored to a cookie (e.g., a persistent cookie), that may later be formatted and transmitted as financial data (e.g., donation or purchase data) to a payment application server. Some embodiments may include transmitting a record of financial data to a payment server without storing the data to a cookie. In some example cases, there may be no need to execute, update, or otherwise involve other screen objects or widgets that may appear on the same web page. In some example cases, this asynchronous paradigm may be illustrated within the context of a partial screen update, whereby only a portion of a web page is updated. A portion may be a screen object or widget implemented using, for example, AJAX, or Dynamic Hyper Text Markup Language (DHTML) technology or techniques. Specifically, it may only be the object or widget implemented using the AJAX technology that is using a request/response mechanism; the entire web page itself need not be updated.

Some embodiments may include the use of AJAX technology and techniques to facilitate this asynchronous paradigm of making payment. In using AJAX technology, rather than a request/response paradigm (e.g., synchronously), the web page may only update on an as-needed basis where, for example, a screen object or widget is modified or otherwise executed. For example, if a user executes a screen object or widget written using the AJAX technique, rather than the entire web page changing to reflect the making of the payment, only the screen object or widget associated with the payment may change. An object or widget written using AJAX techniques (e.g., an AJAX widget) may be implemented together with other objects and widgets using other techniques. In some example cases, these AJAX widgets may be supplied by a third party to be inserted into a web page, in order to bring certain functionality (e.g., the ability to make purchases or to make donations) to the web page.

Example embodiments may include the use of persistent or non-persistent cookies to track a user's transaction decision, and to transmit these purchase decisions without the requirement that a web page be updated. For example, rather than purchase data being exchanged in a request/response manner, a user may record all of his or her transaction information to a cookie, and at some point the data in the cookie may be accessed by, for example, a payment server. Such access would not require updating the web page used to make the transaction, for such an update could be performed asynchronously. These transaction decisions could be executed solely by using a screen object or widget.

In some example embodiments, a widget factory in the form of a widget application server, may generate a payment widget (e.g., an AJAX widget) to be used to engage in transactions asynchronously. For example, a user may connect to the widget application server via initiating a Transmission Control Protocol/Internet Protocol (TCP/IP) session with the widget application server. Once the TCP/IP session is initiated, the user, using a web browser, one may initiate the generation of HTML and supporting JavaScript code using the widget application server. Specifically, the widget application server could generate code that could be copied and pasted onto a web page. A stand-alone application that utilizes TCP/IP may be used in lieu of a web browser to initiate the generation of HTML and JavaScript code. A publishing interface may be used to retrieve the HTML and supporting JavaScript code. This publishing interface may be some type of HTML editor, interpreter that may be used as a stand alone application, or in conjunction with another application such as a browser.

In some example embodiments, the above referenced web page could be a web page that one (e.g., a publisher of the widget, or publisher) intends to transact business upon. This web page may be referred to as a published page. For example, if a party wishes to receive donations via a third-party web site and web pages associated therewith, the party may provide a payment widget to the third party. The payment widget may be used to facilitate the donation or payment of funds to a recipient of funds. This payment widget, once implemented (e.g., placed within a web page of the third-party), could then automatically transact business for the party without interfering with the rest of the third party's web pages.

Some embodiments may include a user (e.g., a visitor to the third party web site) clicking a payment widget to donate to a band, or to purchase a song. A donation amount could either be stored on a browser cookie or sent to a server storing the web page upon which the donation widget appears. In some example cases, the donation widget can intelligently decide when to require immediate payment before delivering a digital good, and when to allow transactions to aggregate. This decision could be made based on the sale or donation amount, but it could also be based on a publisher's preference to require payment before delivering content. Further, a donation widget may be used to make an immediate payment if a user has already signed up (e.g., enrolled) for a service that uses payment widgets. In some example embodiments, the AJAX widget may always display a current donations total, provide a way to "log out" so that a user who shares a computer can prevent others from using their account, and provide a link to review the donations. A donation total may be a total or aggregated amount of money donated or otherwise transacted with a recipient of donated funds.

Some example embodiments may include, the implementation of various business rules associated with one or more payment widgets. For example, if the donation amount combined with all other unpaid donation amounts exceeds a payment threshold, then a payment flow would begin that either bills the buyer or solicits enough information from the buyer to bill them for their unpaid donations. Further, a user may be given 30, 60, or 90 days, or some other suitable period of time to request a refund on any donation made. Additionally, the user could access the refund management page by clicking a link presented within the payment widget, viewing a page containing unpaid donations, and clicking a refund link.

Further, these business rules may also include a micro donation service that may aggregate and intermediate the payments (e.g., the micro payments). For example, a user may make donations across multiple websites or web pages, and may retract some of those donations within 30 days. Once the donations have aged 30 days, the micro payment billing engine may charge the user for the donations, incurring transaction fees. A micro payments billing engine may wait 30 days before issuing disbursements in an attempt to catch most charge backs. In some example cases, the billing engine may wait 45 days, 60 days, or some other suitable period of time as determined by a system administrator, or other suitable person. This suitable period of time may be construed as a billing threshold. If a chargeback comes through within this period, then no disbursements may be made for donations related to the chargeback. A chargeback may be funds that are credited back to a user of the payment widget. Further, the micro payments billing engine may issue disbursements for the donations less some transaction fee (e.g., 10%).

Other business rules may also be implemented. For example, certain additional business rules may be implemented including a:
  Maximum transaction size—because of the aggregation and the risk of chargebacks at higher amounts, a maximum donation size limit may be set (e.g., $10). In the alternative, large amounts may be required to be paid instantly at the time of the donation.

Initial purchase threshold—the number of donations that someone can make without enrolling may be set to the $2-$5 range so that users can become accustomed to the functionality of the payment widget.

Subsequent purchase threshold—the threshold for subsequent purchases may be different than that for the initial purchase.

Threshold based on funding source—if a person implementing the system and method illustrated herein is able to ascertain how a user of the payment widget is paying, the person might set a different payment threshold depending on the user's funding source. eCheck and balance users might pay immediately (threshold=$0), while credit card users might have a higher threshold.

Limited by domain—a person implementing the system and method illustrated herein might set the functionality so that the system and method shown herein only works with a given set of trusted domains (e.g., a trust relationship between two or more domains).

Additional business rules may include having the same logic for the payment widget regardless of whether the user is logged in or out. Further, logged out users may be required to provide their credentials before viewing the refund page. Additionally, users may only be billed for donations that are at least 30 days old.

Example System

FIG. 1 is a diagram of an example system 100 illustrating a request for and the retrieval of widget code. Illustrated is a publisher 101 using a publishing interface 111 that may reside on any one of a number of devices 102 (e.g., a Personal Digital Assistant (PDA) 106, a television 105, a computer system 104, and/or a cell phone 103). Using one of these devices 102, the publisher 101 may send a widget code request 107 across a network 108 to a widget application server 109. When the widget code request 107 is received by the widget application server 109 (e.g., the widget factory), widget code 110 is transmitted by the widget application server 109 back across the network 108 to the one or more devices 102. This widget application server 109 may be implemented by a payment processor such as PAYPAL® of San Jose, Calif. In some example cases, the publisher 101 may pick the widget code 110 and associate it with some type of pre-existing code that is placed into the publishing interface. For example, the publisher 101 may generate a web page containing HTML code and then insert the widget code 110 into this web page. Once inserted, this widget code will appear as rendered code 120. Rendered code 120 may be widget code 110 that is parsed, and interpreted or compiled so as to display a payment widget. A variety of different web-based technologies may be used in association with the publishing interface including, for example, Visual Basic Script (VBScript), JavaScript, Java, and/or other suitable web technologies. For example, a media player 112 written using FLASH® technology from Adobe Systems of San Jose, Calif., may be associated with rendered code 120. The media player 112 may play certain types of digital content, such as digital content 114. This digital content 114 may be provided by a content server 113, and the digital content 114 may accessed using a Hyper Text Transfer Protocol (HTTP), or accessed using an out-of-band protocol such as a Real Time Streaming Protocol (RTSP). The widget code 110 displayed as rendered code 120 and may provide certain types of information with regard to the digital content 114 being played on the media player 112. This information may include, for example, the name of certain artists whose music is being played on the media player 112 and certain types of donation amounts or other monetary values associated with the music that is being played (e.g., the cost to purchase a particular song).

Figure 2:
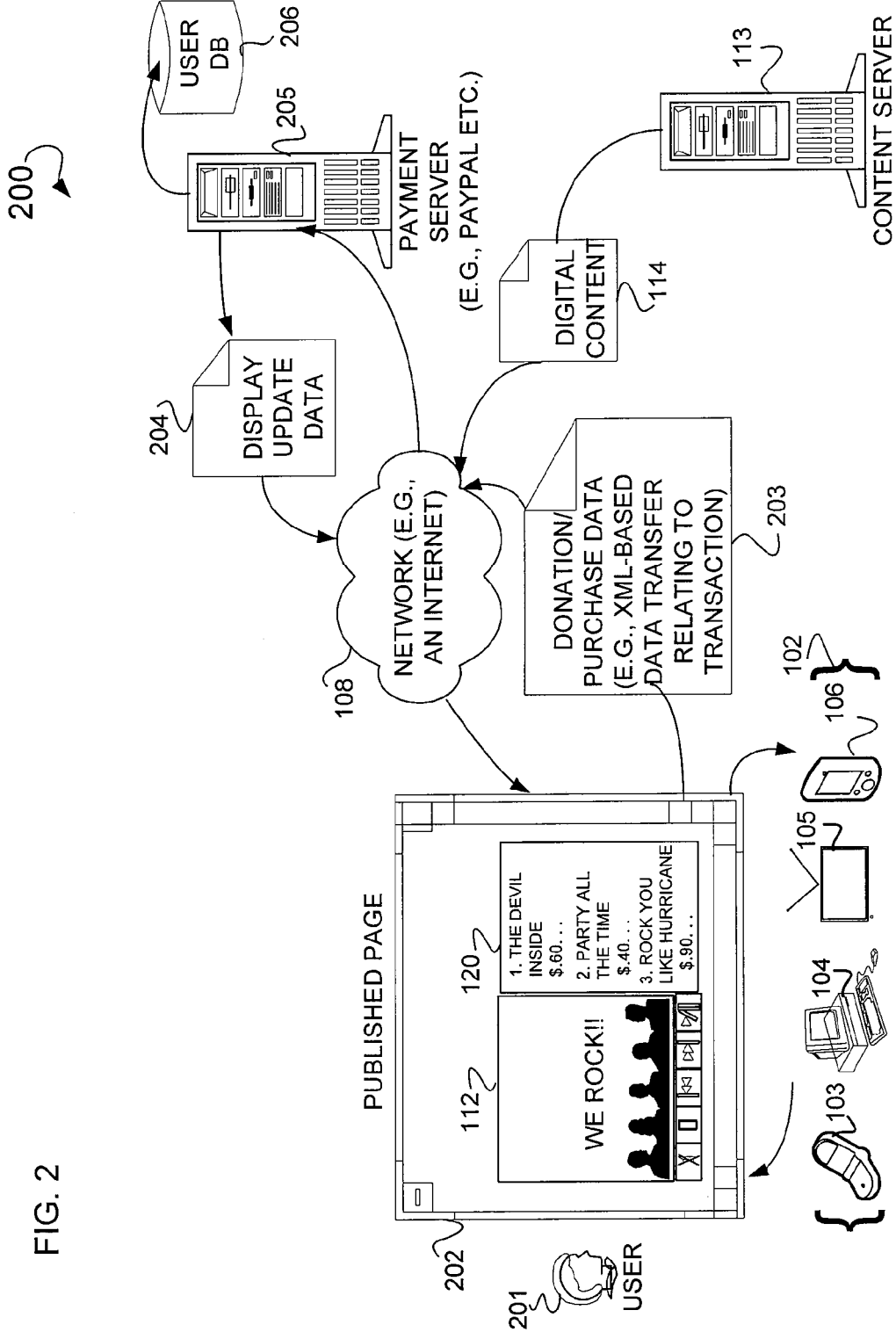
FIG. 2 is a diagram of a system illustrating a published page, according to an example embodiment.

FIG. 2 is a diagram of an example system 200 illustrating a published page. Illustrated is a user 201 who, using a published page 202 that resides on any one of the devices 102 may make a donation or purchase. This donation or purchase may exist in the form of donation or purchase data 203 (e.g., financial data) that is generated when a particular screen object or widget residing on the published page 202 is executed. For example, the previously illustrated media player 112 and rendered code 120, when executed, either together or individually, may generate donation or purchase data 203 that is transmitted across a network 108 to, for example, a payment server 205. This payment server 205 may be implemented by a payment processor such as PAYPAL™. Display update data 204 may be transmitted back across the network 108 to the published page 202 to show an updated amount associated with some portion of the rendered code 120. The display update data 204 (e.g., display update) may a widget with pricing information, current total information, or other suitable information displayed through the rendered code 120. The generation of donation or purchase data may be facilitated through the use of the payment widget as displayed via the rendered code 120. The published page 202 may be rendered by any one of a number of applications (e.g., a web browser application, or stand-alone application) capable of interpreting or otherwise rendering a web page. Also illustrated is a user database 206 that contains a variety of database tables, as reflected in a Relational Data Schema (RDS), which may be more fully illustrated below.

Figure 3:
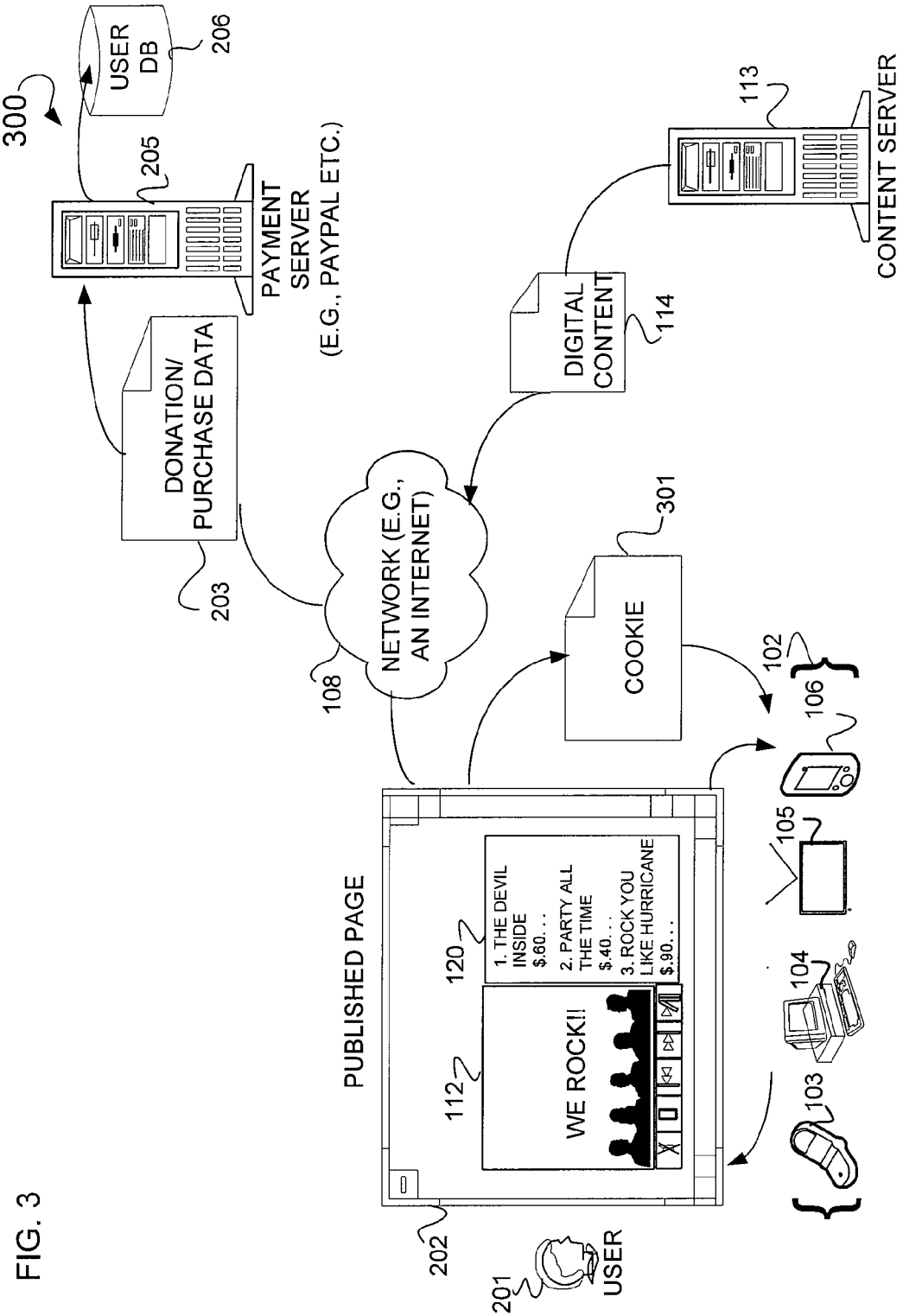
FIG. 3 is a diagram illustrating a system using a cookie in lieu of Asynchronous JavaScript and eXtensible Markup Language (AJAX) techniques, according to an example embodiment.

FIG. 3 is a diagram illustrating an example system 300 using a cookie in lieu of, for example, the asynchronous update feature of the previously illustrated AJAX techniques or technology to process donation or purchase data 203. Illustrated is a user 201, who, using the previously illustrated published page 202, generates certain types of donation and/or purchase data. This donation and/or purchase data is stored onto a cookie 301, which is then stored onto one of the previously illustrated devices 102. At some predetermined point the payment server 205 accesses the cookie 301, and data stored thereon, for the purpose of transacting business in the form of, for example, receiving donation or purchase information. This predetermined point may be every 30 days, 60 days, 90 days, or some other suitable period of time. Once the data contained on the cookie 301 is stored, the rendered code 120 (e.g., the previously provided widget code 110) is updated to reflect various donations or purchases. Example embodiments may include the use of cookie-only technology with ultra-micro payments (e.g., payments below $0.00001), where bandwidth and hardware costs become an issue.

In some example embodiments, a payment widget as reflected in the rendered code 120 is used in combination with a cookie 301. For example, in some embodiments, a cookie 301 is written and stored to a browser cache according to instructions sent by payment server 205. Cookie values (e.g., data contained on the cookie as previous illustrated) may be sent back to the payment server 205 as donation or purchase data 203. Donation or purchase data 203 may be transmitted to the payment server 205 at the expiration of some predetermined time period (e.g., a date or range of dates). Further, the values contained in the cookie 301 may be manipulated by code that is cached on the browser. Specifically, the widget application server 109, or even the payment server 205, may serve up the widget code 110 at the expiration of a predefined deadline or date Then, as the user 201 interacts with the widget, the widget code 110 may manipulate the cookie 301 values. When the user 201 eventually interacts with the server (e.g., 109 or 205) again after the 3 day expiry, then the cookie 301 is sent to the server (e.g., 109 or 205), containing whatever the data was recorded to the cookie 301 by the widget (e.g., widget code 110).

Figure 4:
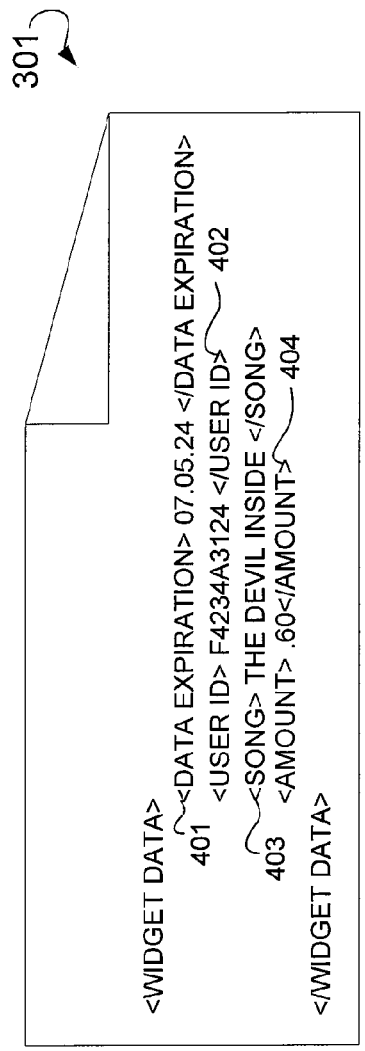
FIG. 4 is a diagram of a cookie, according to an example embodiment.

FIG. 4 is a diagram of an example cookie 301. Example cookie 301 contains data generated by the widget code 110. In some example cases, this data may be formatted using eXtensible Markup Language (XML), or may be formatted using a flat file and some type of character delimiter. Illustrated is an XML data expiration tag 401 showing a data expiration date of Jul. 5, 2024. In some example cases, a date range (e.g., Jul. 5, 2024-Aug. 5, 2004) is shown by this tag, and/or another type of tag (e.g., <date range> . . . </date range>). A user ID tag 402 is shown with a value of F4234A3124 (e.g., in hexadecimal notation) that illustrates a user identification (ID) value. The value contained within user ID tag 402 may be a 128-bit value, or some other value capable of uniquely identifying a user. Further, a song tag 403 is shown that identifies a song. Some other type of digital content may be identified with a suitable tag (e.g., <movie>, <picture>, etc.). Further, in some example embodiments, no digital content tag is required. Some example embodiments may include an amount tag 404 that denotes the amount of a donation or purchase. This amount may be aggregated over a period of time as defined by the data expiration tag 401.

Figure 5:
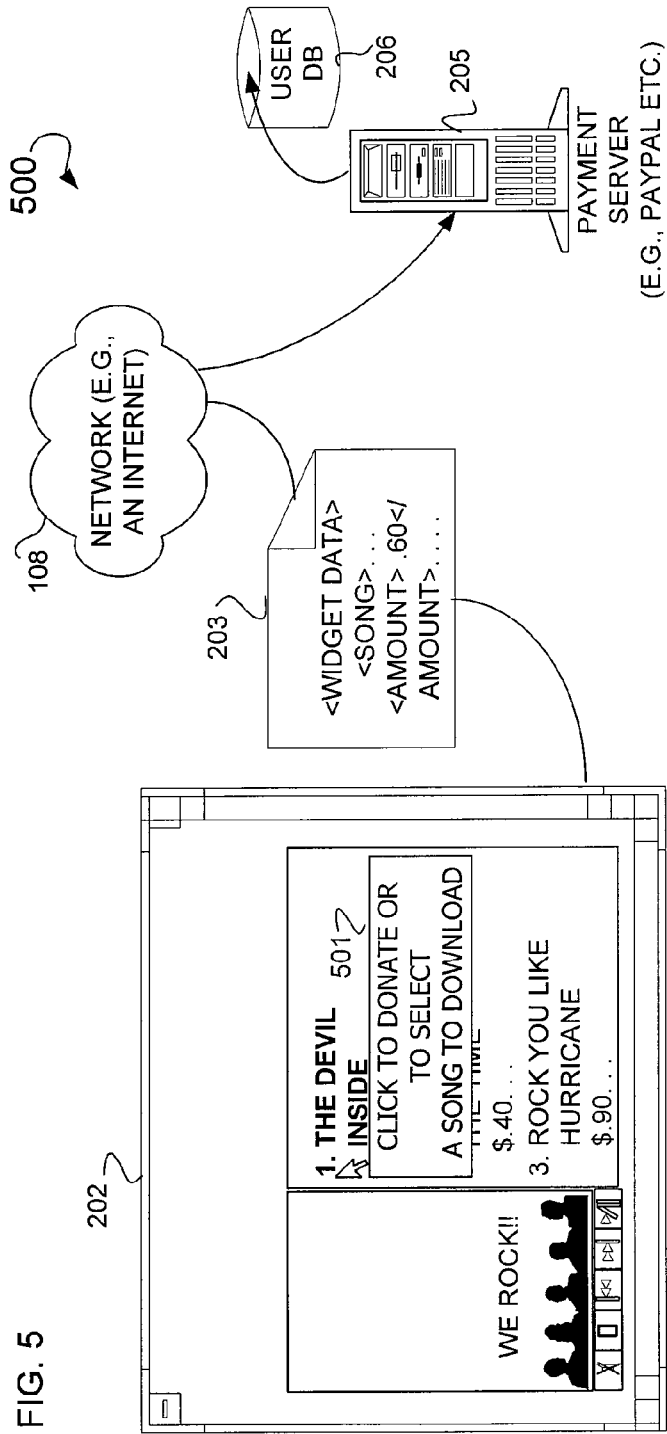
FIG. 5 is a diagram of a system illustrating the generation of data in the form of donation or purchase data utilizing various AJAX technologies and techniques, according to an example embodiment.

FIG. 5 is a diagram of an example system 500 illustrating the generation of data in the form of, for example, donation or purchase data utilizing various AJAX technologies or techniques. Illustrated is a published page 202 wherein a pointer 501 is depicted with a label stating "click to donate or to select a song to download". When a user 201 clicks on a particular song, data pertaining to that song is sent to an AJAX engine, which then generates data in the form of, for example, donation or purchase data 203 (e.g., formatted data). This formatted data may be, for example, XML, HTML, or some other type of formatted data. The formatted donation or purchase data 203 is sent across the network 108 to the payment server 205.

Figure 6:
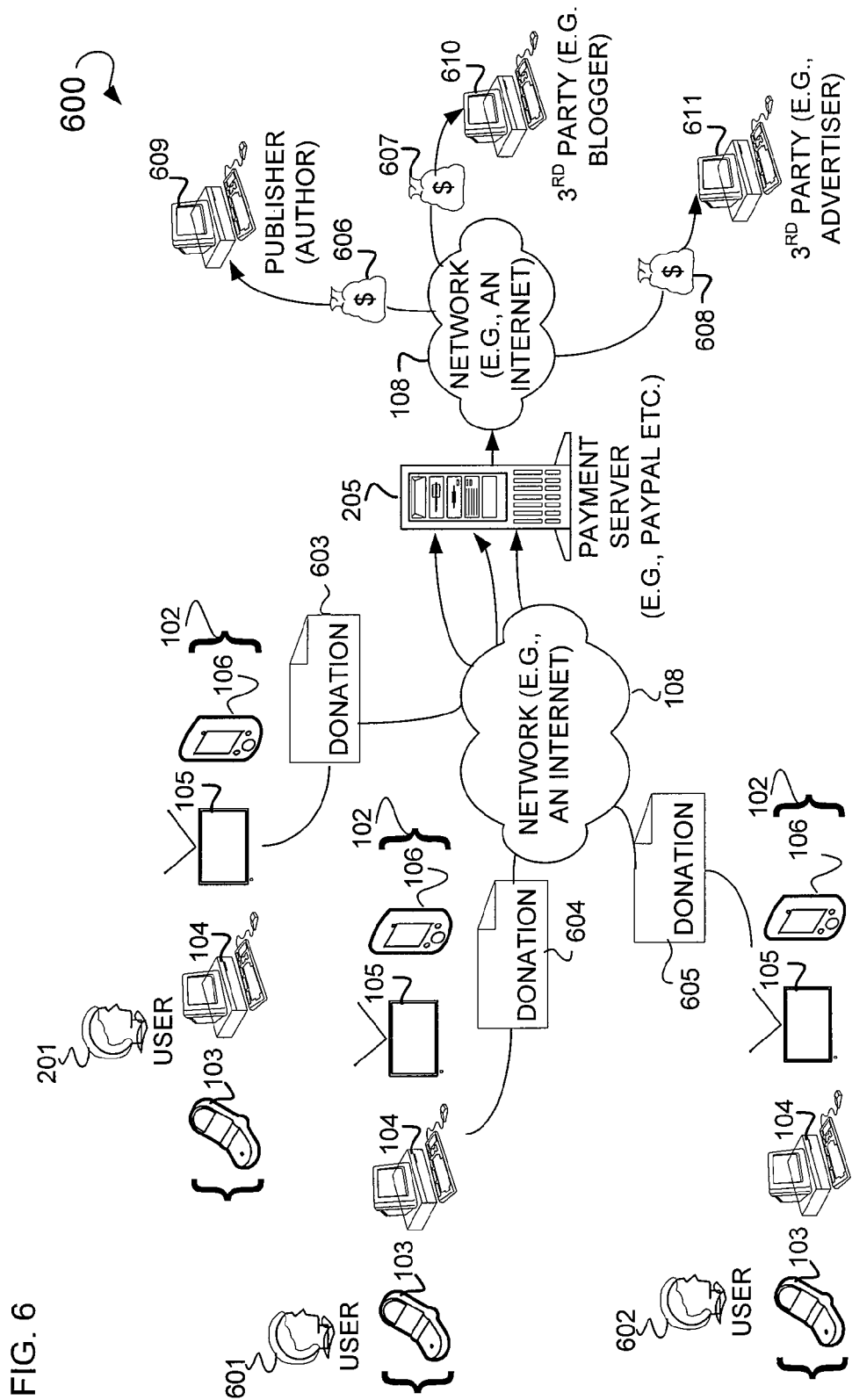
FIG. 6 is a diagram of a payment distribution system illustrating the distribution of various donation or purchase monies, according to an example embodiment.

FIG. 6 is a diagram of an example payment distribution system 600 illustrating the distribution of various donation or purchase monies. Illustrated are users 201, 601, and 602 who, using one or more of the devices 102, make one or more donations 603, 604, and 605. As described herein, the donations 603, 604, and 605 may be purchase monies provided in exchange for a good or service. A good may include music. The donations 603, 604, and 605 may be formatted as the donation or purchase data 203. These various donations 603, 604, and 605 are then transmitted across a network 108 to a payment server 205. The payment server 205, using the network 108, may distribute the donations 603, 604, and 605 to various parties who may be contractually guaranteed certain payment amounts. The donations 603, 604, and 605 may be used to satisfy this contractual guarantee. Payment amounts 606, 607, and 608 are then transmitted to various parties across the network 108. The account of the user 201 may be billed (e.g., billing an account) prior to or contemporaneous with the transmission of the payment amounts 606, 607, and 608. This billing of the account may be based upon aggregated financial data. Aggregated financial data may include financial data for a particular recipient of a payment or donation relating to the amount of the donation or payment. These parties may include, for example, a publisher 609, a third party 610 (e.g., a blogger), or a third party 611 in the form of an advertiser. In lieu of, or in addition to, donations 603, 604, and 605, the monies provided for the purchase of certain goods or services may also be distributed to one or more of the previously illustrated parties 201, 601, and 602 as a rebate.

Example Interface and Data Format

FIG. 7 is a diagram of a published page 202 illustrating rendered widget code 110 in the form of text 701, 702, and 703. Collectively, text 701, 702, and 703 is represented as the previously referenced rendered code 120. Also, illustrated is a button 704, which allows the user 201 to log out or otherwise discontinue use of the widget code 110. The period during which use may be discontinued may include a web session (e.g., a TCP/IP based session), or other predefined session. With regard to text 701, the title of a song is illustrated as "The Devil Inside." Additionally, a value in the form of 70 cents is associated with the song. This value may be, for example, a donation value or it may be a purchase value associated with the purchase of the song. In addition, a current total text is illustrated as $10. Further, a web link is illustrated that may link to, for example, the song artist. Text 702 illustrates a song title of "Party All the Time," with a minimum of 40 cents and current total of $7.50. A link to a web site otherwise associated with the artist is also provided. Text 703 illustrates a song title of "Rock You Like Hurricane," with a minimum of 90 cents and current total of $2.10. A link to a web site associated with the artist is also shown. Rendered code 120 may be associated with, for example, a media player 112, or some type of screen object or widget.

FIG. 8 is a diagram of example formatted donation or purchase data 203. Illustrated is XML formatted donation or purchase data 203. Contained in this XML are a number of tags 801, 802, 803, and 804 that may mirror the data contained in the cookie 301. With regard to tag 801, a data expiration field is shown that discloses the data as expiring on Jul. 5, 2024. A tag 802 reflects a user ID in the field, where the user ID is F4234A3124. With regard to tag 803, a song title is shown, where the title is "The Devil Inside." A tag 804 is shown that denotes a field used to contain an amount, which here is 60 cents.

Example Logic

FIG. 9 is a sequence diagram 900 illustrating an example sequence for the asynchronous transmission of data. Illustrated is a precondition 901 wherein input is received by a payment widget (e.g., AJAX widget). In some example embodiments, the input may be in the form of a mouse-over operation focused on the payment widget as reflected in the rendered code 120. A client-side application may then asynchronously transfer donation or purchase data 203 using an AJAX engine. These operations are collectively referenced here as 902. This AJAX engine may transfer data in any one of a number of data formats (e.g., XML, character delimited flat file etc.). Further, a payment side server executes a step of transferring data to update (see e.g., display update data 204) a screen object or a widget that may contain, for example, donation or purchase data. Collectively these operations are referenced as 903.

FIG. 10 is a block diagram of an example server 1000. Pictured is a plurality of modules that, in some example embodiments, are used in a payment server 205, or widget application server 109. These modules may be hardware, software, or firmware. Shown is a computer system that includes a first receiver 1001 to receive financial data generated by a widget residing on a web page, the financial data including at least one of donation, or purchase data. A transmitter 1002 is also shown to transmit a display update to update the widget, the updating based upon the financial data. A recording engine 1003 is shown to record and aggregate the financial data to create aggregated financial data. Additionally, a billing engine 1004 is shown to bill an account, the account billed based upon a billing threshold met by the aggregated financial data. In some example embodiments, the billing threshold includes at least one of a monetary value, a date value, or a number of transactions value. A retriever 1005 is also shown to retrieve the financial data from a cookie stored in a browser cache. A flow initiator 1006 is illustrated to initiate a sign-up flow to retrieve the financial data from the cookie. Further, the billing engine 1004 may be used to bill an account based upon the financial data retrieved from the cookie. Some example embodiments may include, the financial data being generated using a technique including at least one of AJAX language technique, or a DHTML technique. Moreover, in some example embodiments, a storage engine 1007 may be implemented to record the financial data generated by the widget residing on the web page to a user database. The transmitter 1002 may also be used to transmit an update to update only the widget using a partial screen update to reflect current donation totals, the updating occurring where a billing threshold is met. Additionally, a widget generator 1008 may be implemented to generate widget code to be placed into the web page.

FIG. 11 is a block diagram of an example device 102. Pictured is a plurality of modules that, in some example embodiments, are used in a device 102. These modules may be hardware, software, or firmware. In some example embodiments, a selector 1101 is implemented to select a widget using an input device to generate data including at least one of donation or purchase data. An input device may be a mouse, light pen, keyboard, touch screen or other suitable input device. A transmitter 1102 is implemented to transmit the at least one of donation or purchase data. A storage engine 1103 may be used to store the at least one of donation or purchase data to a cookie. In some example embodiments, a widget is generated using a computer language including at least one of AJAX, or DHTML.

FIG. 12 is a flow chart of an example method 1200 used to generate payment or donation data. Various operations are shown that are executed by the widget application server 109, or payment server 205. An operation 1201 is executed that receives financial data generated by a widget residing on a web page, the financial data including at least one of donation, or purchase data. An operation 102 is shown that when executed transmits a display update to update the widget, the updating based upon the financial data. Further, an operation 1203 is illustrated that records and aggregates the financial data to create aggregated financial data. Operation 1204, when executed, bills an account, the billing predicated upon a billing threshold being met by the aggregated financial data. In some example embodiments, the billing threshold includes at least one of a monetary value, a date value, or a number of transactions value. In some example embodiments, an operation 1205 is executed that retrieves the financial data from a cookie stored in a browser cache. An operation 1206 is executed that initiates a sign-up flow to retrieve the financial data from the cookie. Operation 1207 is shown that bills an account based upon the financial data retrieved from the cookie. In some example embodiments, the financial data is generated using at technique including at least one of an AJAX language technique, or a DHTML technique. An operation 1208 may be executed that includes recording the financial data generated by the widget residing on the web page to a user database. An operation 1209 may be executed that includes transmitting an update to update only the widget using a partial screen update to reflect current donation totals, the updating occurring where a billing threshold is met. Operation 1210 when executed generates widget code to be placed into the web page.

FIG. 13 is a flow chart of an example method 1300 used to select a widget to make a payment or donation. This example method 1300 may be executed by a device 120. Shown is an operation 1301 that when executed selects a widget using an input device to generate data including at least one of donation or purchase data. An operation 1302 is shown that when executed transmits the donation or purchase data. An operation 1303 is shown that stores the at least one of donation or purchase data to a cookie. In some example embodiments, the widget is generated using a computer language including at least one of AJAX, or DHTML.

Figure 14:
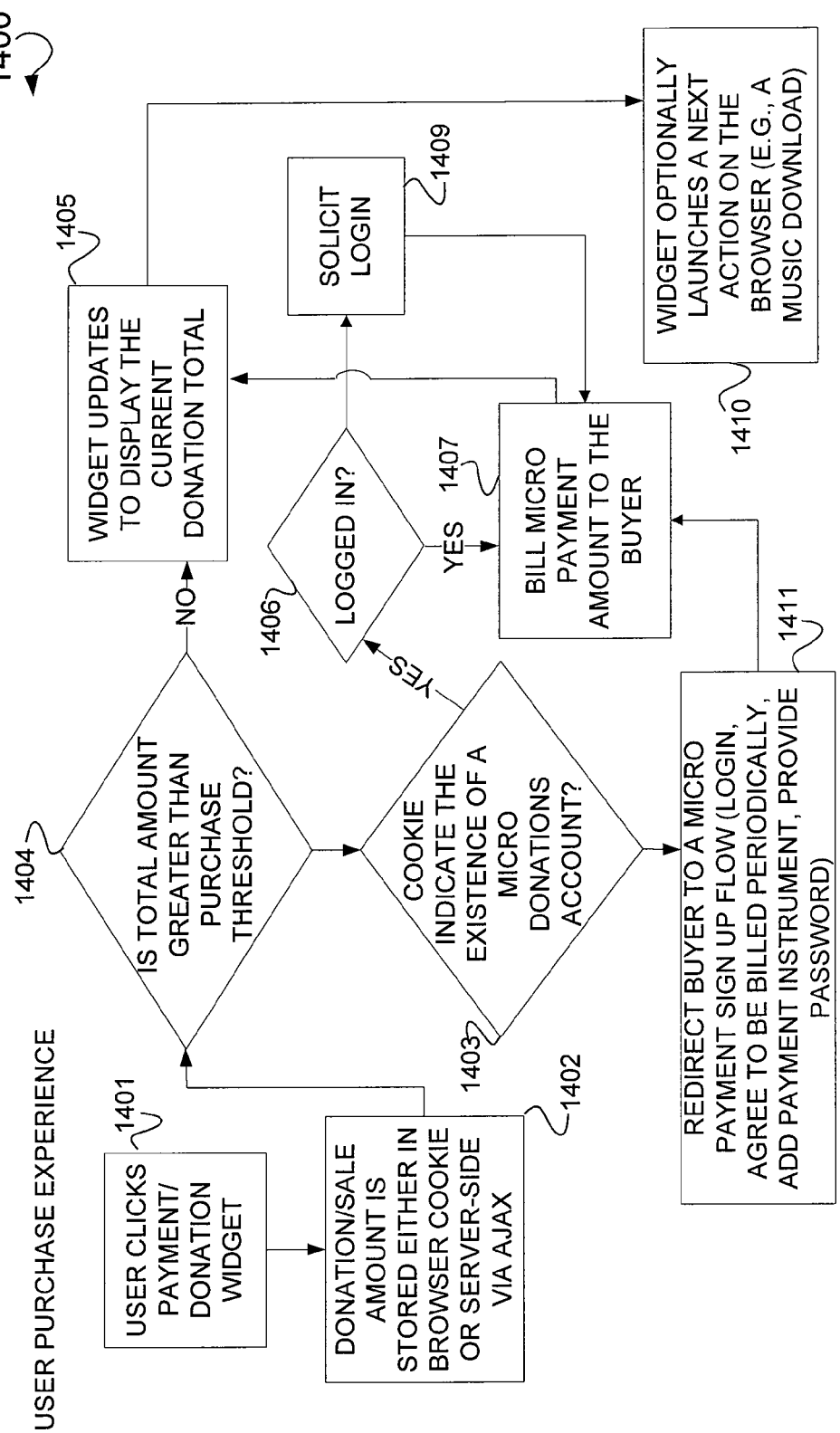
FIG. 14 is a flowchart illustrating a method used to update a screen object or a widget, according to an example embodiment.

FIG. 14 is a flowchart illustrating an example method 1400 used to update a screen object or widget. Operations 1101 through 1102, and 1110 may be executed by one of the devices 102. Operations 1103 through 1109, and 1111 may be executed by the widget application server 109 or payment server 205. Illustrated is an operation 1401, wherein a user clicks on a payment or payment widget. An operation 1402 may be executed where a donation or purchase amount is stored in either a browser cookie (e.g., a persistent browser cookie), or on a server side via, for example, an AJAX technique. A decisional operation 1404 is executed wherein a determination is made as to whether or not a purchase or donation amount exceeds some threshold value. In cases where decisional operation 1404 evaluates to false (e.g., "no"), an operation 1405 is executed wherein a widget is updated to display a current donation total. In cases where decisional operation 1404 evaluates to true (e.g., "yes"), a second decisional operation 1403 is executed wherein a query is made regarding whether or not the user 201 has already made a donation. In cases where a decisional operation 1403 evaluates to true (e.g., "yes"), a third decisional operation 1406 is executed that determines whether or not a user is logged in. In some example embodiments, rather than a user being prompted with a plurality of login pages, as is commonly the case with the request/response paradigm, a user, utilizing AJAX technology, may only be prompted with a login page where a certain threshold value for a donation or purchase has been met. In cases where this threshold value has been met or, for example, a user has already made a donation, the decisional operation 1406 may evaluate whether or not the user has logged in. In cases where the user has not logged in, an operation 1409 may execute to solicit login information from the user. In cases where decisional operation 1406 evaluates to true (e.g., "yes"), an operation 1407 may execute that may bill a micropayment amount to the user. With regard to decisional operation 1403, where decisional operation 1403 evaluates to false (e.g., "no"), an operation 1411 may execute that may redirect a buyer to a micropayment sign-up flow (see e.g., FIG. 1). Subsequent to the execution of operation 1405, an operation 1410 may execute wherein the widget may facilitate the download of purchased music (e.g., a Windows Media Audio (WMA) file), or some other type of suitable purchased digital content (e.g. a Motion Picture Expert Group (MPEG) file). In certain cases, subsequent to the execution of the operation 1407, operation 1405 may be executed.

Some embodiments may include a method including receiving financial data generated by a widget residing on a display page (e.g., operation 1401), and updating only the widget using a partial screen update, with the update being based upon the financial data (e.g., operation 1405). Further, the financial data may include at least one of purchase data or donation data. The method may also include recording and aggregating the financial data (e.g., 1404), and billing an account (e.g., 1407), the billing predicated upon a billing threshold being met by the aggregated financial data. Moreover, the billing threshold may include at least one of a monetary value, a date value, or a number of transactions value. Additionally, the method may further include retrieving account information from a cookie, initiating a sign-up flow to receive account data, the account data being used to populate the cookie, and then billing an account. The method may additionally include receiving financial data generated by using an AJAX technique. Furthermore, the method may include retrieving financial data from a cookie, the financial data including at least one of donations data, or purchase data. The method may include recording the financial data generated by the widget residing on a display page, updating only the widget using a partial screen update to reflect current donation totals, with the update occurring where a threshold is met. Additionally, the method may include generating widget code to be placed into the display page.

Example Database Schema

Figure 15:
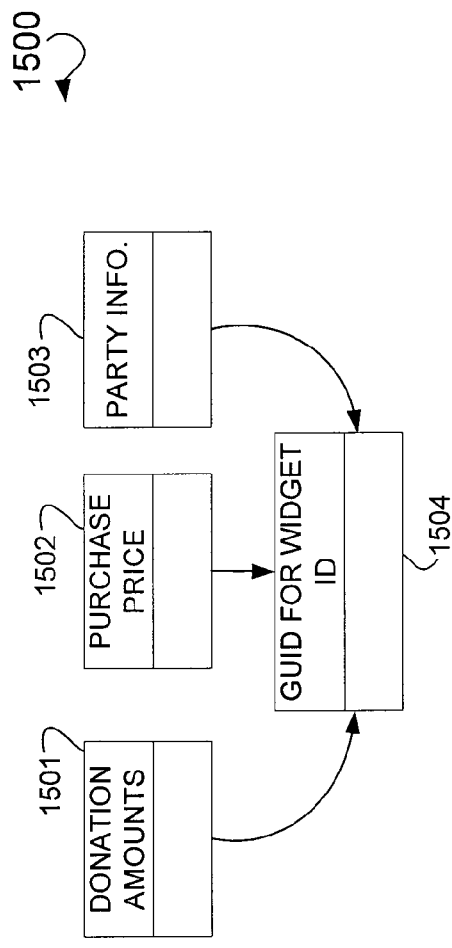
FIG. 15 is a generic Relational Data Schema (RDS), according to an example embodiment.

FIG. 15 is an example RDS 1500. Illustrated is a plurality of tables that may exist in, for example, a database (e.g., user database 206) that may reside as part of, for example, the systems 100, 200, 300, 500, and/or 600. Pictured is a table 1501 that contains donation amounts. These donation amounts may be of some type of monetary value and may be stored as, for example, a data type such as an integer, float, double, or even a currency data type. A table 1502 is shown that contains purchase price information. This purchase price information may be stored as, for example, an integer, string, float, or currency data type. Further, a table 1503 is illustrated that contains party information. This may be information relating to a particular party who makes a donation or purchase, and may be stored as, for example, a string or other suitable data type. Additionally, a table 1504 is illustrated that provides for constraint values to be applied to the data contained in the tables 1501 through 1503. These constraint values may be, for example, a Globally Unique Identifier (GUID) for a particular widget that may serve to distinguish one widget from another widget, and also to distinguish the donation information, price information, or party information associated with that widget from other widgets.

Figure 16:
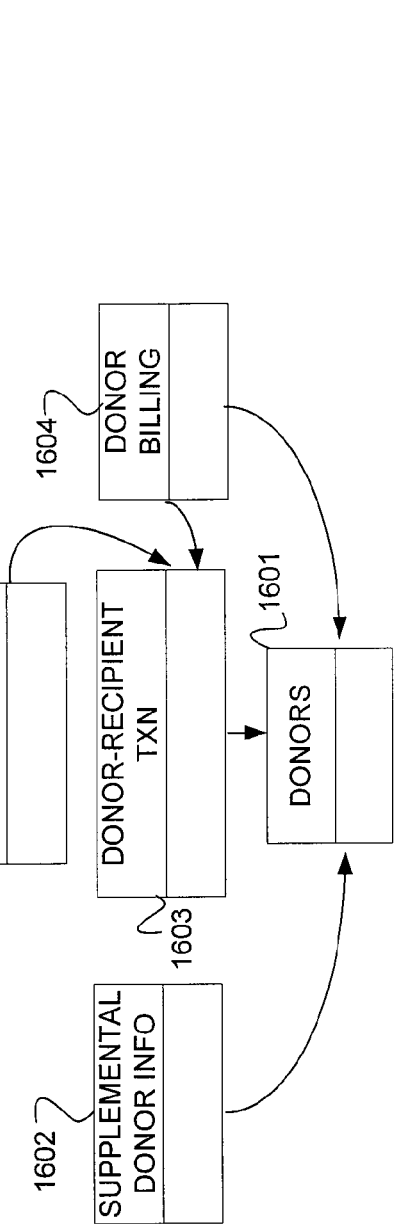
FIG. 16 is an RDS for specific recipients and donors, according to an example embodiment.

FIG. 16 is an example RDS 1600. Illustrated is a plurality of tables that may exist in, for example, a database (e.g., 206) that may reside as a part of, for example, the systems 100, 200, 300, 500, and/or 600. Illustrated is a donors table 1601 that contains unique key (e.g., a unique ID) that serves to identify a donor. This unique key may be an integer data type, and may serve as an internal constraint value for the rest of the tables illustrated herein. A supplemental donor information table 1602 is illustrated that contains a number of data fields including the unique key, a browser ID, and a 3rd party ID. The browser ID value may serve to uniquely identify the browser that is associated with rendering a particular piece of rendered code 120. Further, the 3rd party ID may be generated by a 3rd party and may allow payment server 205 to correlate a payment server 205 user (e.g., 201) with a specific service (e.g., MYSPACE™). An example of how this would be used is that MYSPACE™ may make a user's ID (e.g., a MYSPACE™ user) available through a web page variable (e.g., in JavaScript), or through some other readable location on a page, or in the Uniform Resource Locator (URL). The rendered code 120 may then write this value to the cookie 301, or send to the payment server 205 so that the payment server 205 knows that, for example, MYSPACE™ user "jsmith" is associated with payment server 205 user "F4234A3124" (see FIG. 4). When "jsmith" uses a different computer or a different browser to view MYSPACE™ profiles that contain the payments widget 110, payment server 205 may be able to recognize that this is actually user F4234A3124. Also illustrated is a donor-recipient transaction table 1603 that contains data relating to unique key, recipient unique ID (e.g., an integer data type), transaction amount, transaction date/time (e.g., a string or date data type), billing ID (e.g., an integer data type), payout ID (e.g., an integer data type), and status (e.g., refunded, chargeback, etc., shown as, for example, a string data type).

Further, a donor billing table 1604 is also illustrated. Shown is a table 1604 containing a billing ID value (e.g., an integer data type illustrating a transaction), a billed amount (e.g., an integer or currency data type illustrating the amount of a transaction), funding source (e.g., a string data type illustrating the source of payment such as credit card, check, etc.), and a unique key. Additionally, a recipient table 1605 is illustrated with a payout ID, amount paid (e.g., an integer or currency data type illustrating the donation or payment amount), fees (e.g., an integer data type illustrating the fees paid for the donation or payment), and recipient unique ID. Moreover, a recipient payout table 1606 is illustrated that contains a recipient unique ID value.

Example Three-Tier Architecture

In some example embodiments, a method is illustrated as being implemented in a distributed or non-distributed software application designed under a three-tier architecture paradigm, whereby the various components of computer code that implement this method may be categorized as belonging to one or more of these three tiers. Some embodiments may include a first tier as an interface (e.g., an interface tier) that is relatively free of application processing. Further, a second tier may be a logic tier that performs application processing in the form of logical/mathematical manipulations of data inputted through the interface level, and communicates the results of these logical/mathematical manipulations to the interface tier and/or to a backend, or storage tier. These logical/mathematical manipulations may relate to certain business rules or processes that govern the software application as a whole. A third storage tier may be a persistent storage medium or non-persistent storage medium. In some example cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as may be discussed below, a variety of technologies. This three-tier architecture, and the technologies through which it is implemented, may be executed on two or more computer systems organized in a server-client, peer to peer, or some other suitable configuration. Further, these three tiers may be distributed across more than one computer system as various software components.

Example Component Design

Some example embodiments may include the above described tiers, and processes or operations that make them up, as being written as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component oriented, or object-oriented programming technique can be implemented using a Visual Component Library (VCL), Component Library for Cross Platform (CLX), Java Beans (JB), Enterprise Java Beans (EJB), Component Object Model (COM), Distributed Component Object Model (DCOM), or other suitable technique. These components may be linked to other components via various Application Programming Interfaces (APIs), and then compiled into one complete server, client, and/or peer software application. Further, these APIs may be able to communicate through various distributed programming protocols as distributed computing components.

Example Distributed Computing Components and Protocols

Some example embodiments may include remote procedure calls being used to implement one or more of the above illustrated components across a distributed programming environment as distributed computing components. For example, an interface component (e.g., an interface tier) may reside on a first computer system that is remotely located from a second computer system containing a logic component (e.g., a logic tier). These first and second computer systems may be configured in a server-client, peer-to-peer, or some other suitable configuration. These various components may be written using the above illustrated object-oriented programming techniques, and can be written in the same programming language, or a different programming language. Various protocols may be implemented to enable these various components to communicate with one another regardless of the programming language used to write them. For example, a component written in C++ may be able to communicate with another component written in the Java programming language by using a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model or TCP/IP protocol stack model for defining the protocols used by a network to transmit data.

Example System of Transmission between a Server and Client

Some embodiments may utilize the OSI model, or TCP/IP protocol stack model for defining the protocols used by a network to transmit data. In applying these models, a system of data transmission between a server and client, or between peer computer systems is illustrated as a series of roughly five layers comprising an application layer, a transport layer, a network layer, a data link layer, and a physical layer. In the case of software having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some example cases, the term internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Example Computer System

Figure 17:
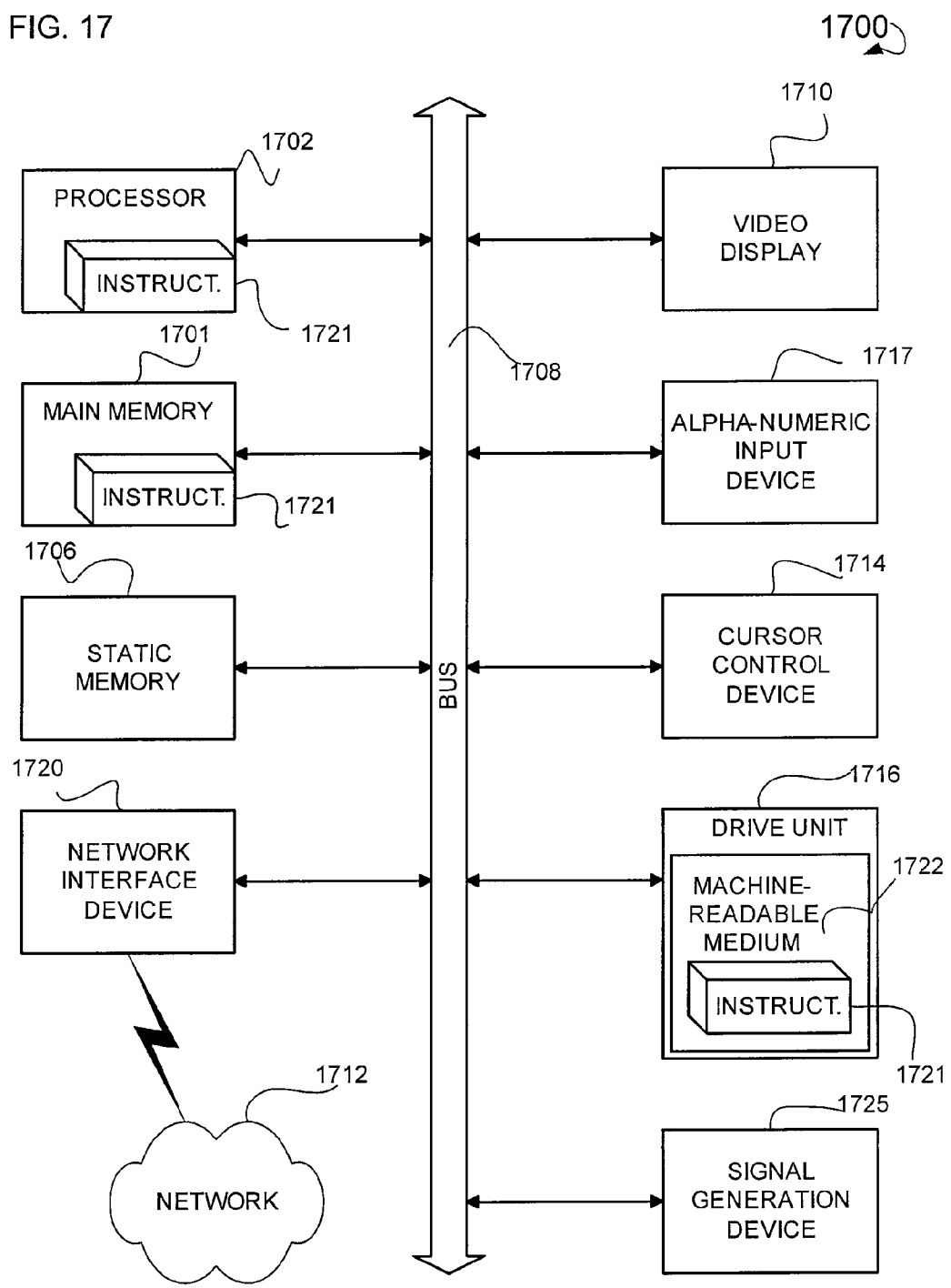
FIG. 17 is a diagrammatic representation of a machine in the example form of a computer system, according to an example embodiment.

FIG. 17 shows a diagrammatic representation of a machine in the example form of a computer system 1700 that executes a set of instructions to perform any one or more of the methodologies discussed herein. One of the devices 102 may be configured as a computer system 1700. In alternative embodiments, the machine operates as a stand-alone device or may be connected (e.g., networked) to other machines. In a networked deployment, the machine may operate in the capacity of a server or a client machine in server-client network environment or as a peer machine in a peer-to-peer (or distributed) network environment. The machine may be a PC, a tablet PC, a Set-Top Box (STB), a PDA, a cellular telephone, a web appliance, a network router, switch, or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 1700 includes a processor 1702 (e.g., a Central Processing Unit (CPU), a Graphics Processing Unit (GPU) or both), a main memory 1701, and a static memory 1706, which communicate with each other via a bus 1708. The computer system 1700 may further include a video display unit 1710 (e.g., a Liquid Crystal Display (LCD) or a Cathode Ray Tube (CRT)). The computer system 1700 also includes an alphanumeric input device 1717 (e.g., a keyboard), a User Interface (UI) cursor controller 1714 (e.g., a mouse), a disk drive unit 1716, a signal generation device 1725 (e.g., a speaker) and a network interface device (e.g., a transmitter) 1720.

The drive unit 1716 includes a machine-readable medium 1722 on which is stored one or more sets of instructions and data structures (e.g., software) 1721 embodying or used by any one or more of the methodologies or functions illustrated herein. The instructions 1721 may also reside, completely or at least partially, within the main memory 1701 and/or within the processor 1702 during execution thereof by the computer system 1700, the main memory 1701 and the processor 1702 also constituting machine-readable media. The instructions 1721 may further be transmitted or received over a network 1712 via the network interface device 1720 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic media, and carrier wave signals.

Example Marketplace Applications

Example embodiments may include a method and system for making donations and payment using micro payments. This method and system may allow for the payments and donations to be made without requiring a user to execute a payment flow, where such payment flows use a plurality of web pages to facilitate or otherwise process a payment or donation. Rather, through using technology including, for example, AJAX technology, a user may make a payment or donation that is reflected via a partial screen update (e.g., the entire web page need not be refreshed). With regard to the payment itself, in some example embodiments, a user may be able to make payments or donations up to some threshold value. Once this threshold value is reached, the user may be required to make the payments (e.g., actual monies may be exchanged).

The Abstract of the Disclosure is provided to comply with 37 C.F.R. §1.72(b), requiring an abstract that may allow the reader to quickly ascertain the nature of the technical disclosure. It is submitted with the understanding that it may not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    receiving, by a server from a persistent storage medium on a client device of a user, financial data corresponding to a transaction initiated by the user, the financial data being generated by a widget executing on a web page and indicating an amount to be billed in exchange for a good or service;
    transmitting, from the server to the client device, an update of the widget based on the financial data, the update comprises current financial data indicating a total amount to be billed in exchange for one or more goods or services and is displayed by the widget as a partial screen update of the web page;
    retrieving, by the server, the financial data that corresponds to the transaction initiated by the user from the persistent storage medium;
    periodically recording and aggregating, by the server, the financial data retrieved from the persistent storage medium to create aggregated financial data; and
    billing, by the server, an account of the user based on the aggregated financial data, the billing predicated on a billing threshold being met by the aggregated financial data.

2. The method of claim 1, wherein the billing threshold includes at least one of a monetary value, a date value, or a number of transactions value.

3. The method of claim 1, wherein the financial data is generated using techniques including at least one of an Asynchronous JavaScript and eXtensible Markup (AJAX) language technique, or a Dynamic Hyper Text Markup Language (DHTML) technique.

4. The method of claim 1, further comprising generating widget code to execute on the client device.

5. The method of claim 1, wherein the financial data comprises at least one of a digital content tag or an amount tag.

6. The method of claim 1, further comprising:
    receiving an indication of a funding source of the user associated with the account of the user; and
    adjusting the billing threshold based on the indication of the funding source.

7. A computer system for tracking purchase data, the computer system comprising:
    a receiver to receive, from a persistent storage medium on a user system of a user, financial data that corresponds to a transaction initiated by the user, the financial data being generated by a widget that resides on a web page and indicating an amount to be billed in exchange for a good or service;
    a transmitter to transmit, from the server to the user system, an update of the widget based on the financial data, the update comprises current financial data indicating a total amount to be billed in exchange for one or more goods or services and is displayed by the widget as a partial screen update of the web page;
    a retriever to retrieve the financial data that corresponds to the transaction initiated by the user from a persistent storage medium on the user system;
    a recording engine to periodically record and aggregate the financial data retrieved from the persistent storage medium to create aggregated financial data; and
    a billing engine to bill an account of the user based on the aggregated financial data, the billing predicated on a billing threshold being met by the aggregated financial data.

8. The computer system of claim 7, wherein the billing threshold includes at least one of a monetary value, a date value, or a number of transactions value.

9. The computer system of claim 7, wherein the financial data is generated using an technique including at least one of Asynchronous JavaScript and eXtensible Markup (AJAX) language technique, or a Dynamic Hyper Text Mark Up (DHTML) technique.

10. The computer system of claim 7, further comprising a widget generator to generate widget code to be placed into the web page.

11. The computer system of claim 7, wherein the financial data comprises at least one of a digital content tag or an amount tag.

12. An apparatus for tracking purchase data, the apparatus comprising:
    means for receiving, by a server from a persistent storage medium on a client device of a user, financial data corresponding to a transaction initiated the user, the financial data being generated by a widget executing on a web page and indicating an amount to be billed in exchange for a good or service;
    transmitting, from the server to the client device, an update of the widget based on the financial data, the update comprises current financial data indicating a total amount to be billed in exchange for one or more goods or services and is displayed by the widget as a partial screen update of the web page;

retrieving, by the server, the financial data that corresponds to the transaction initiated by the user from a persistent storage medium;

periodically recording and aggregating, by the server, the financial data retrieved from the persistent storage medium to create aggregated financial data; and billing, by the server, an account of the user based on the aggregated financial data, the billing predicated on a billing threshold being met by the aggregated financial data.

13. A non-transitory machine-readable medium storing instructions that, when executed by at least one processor of a machine, cause the machine to perform operations comprising:

receiving, by a server from a persistent storage medium on a user device of a user, financial data corresponding to a transaction initiated the user, the financial data being generated by a widget executing on a web page and indicating an amount to be billed in exchange for a good or service;

at a first time, an update of the widget based on the financial data, the update of the widget to display a portion of the financial data;

transmitting, from the server to the user device, an update of the widget based on the financial data, the update comprises current financial data indicating a total amount to be billed in exchange for one or more goods or services and is displayed by the widget as a partial screen update of the web page;

retrieving, by the server, the financial data that corresponds to the transaction initiated by the user from a persistent storage medium;

periodically recording and aggregating, by the server, the financial data retrieved from the persistent storage medium to create aggregated financial data; and billing, by the server, an account of the user based on the aggregated financial data, the billing predicated on a billing threshold being met by the aggregated financial data.

\* \* \* \* \*